(12) United States Patent
Sawaoka

(10) Patent No.: US 12,379,706 B2
(45) Date of Patent: Aug. 5, 2025

(54) NUMERICAL CONTROL SYSTEM

(71) Applicant: FANUC CORPORATION, Yamanashi (JP)

(72) Inventor: Hiroki Sawaoka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 400 days.

(21) Appl. No.: 18/041,067

(22) PCT Filed: Aug. 26, 2021

(86) PCT No.: PCT/JP2021/031377
§ 371 (c)(1),
(2) Date: Feb. 8, 2023

(87) PCT Pub. No.: WO2022/045254
PCT Pub. Date: Mar. 3, 2022

(65) Prior Publication Data
US 2023/0305517 A1 Sep. 28, 2023

(30) Foreign Application Priority Data
Aug. 31, 2020 (JP) .................. 2020-146211

(51) Int. Cl.
G05B 19/4061 (2006.01)
(52) U.S. Cl.
CPC .............. G05B 19/4061 (2013.01); G05B 2219/49157 (2013.01)
(58) Field of Classification Search
None
See application file for complete search history.

(56) References Cited

U.S. PATENT DOCUMENTS

2012/0330456 A1* 12/2012 Tsuda ................. G05B 19/4061
700/186
2023/0288903 A1* 9/2023 Sawaoka ............. G05B 19/408

FOREIGN PATENT DOCUMENTS

| JP | 2009-054043 A | 3/2009 |
| JP | 2011-183528 A | 9/2011 |
| JP | 5857803 B2 | 2/2016 |

OTHER PUBLICATIONS

International Search Report issued in PCT/JP2021/031377; mailed Nov. 9, 2021.

* cited by examiner

*Primary Examiner* — Ryan A Jarrett
(74) *Attorney, Agent, or Firm* — Studebaker Brackett PLLC

(57) ABSTRACT

According to the present invention, a numerical control device 3 moves a plurality of machine elements of a machine tool 2 along a plurality of control axes on the basis of a moving pulse and performs an interference check calculation between two machine elements forming a prescribed set to be checked. The numerical control device 3 comprises: an orientation dependence information storage unit 53 which stores orientation dependence information that depends on shape and orientation and does not depend on the position of each of the two machine elements forming the set to be checked; an interference check unit 36 which performs an interference check calculation on the basis of pieces of position information and the pieces of the orientation dependence information about the machine elements; and an orientation dependence information update unit 52 which acquires pieces of shape information and pieces of orientation information about the machine elements, and updates the pieces of orientation dependence information on the basis of the pieces of shape information and the pieces of (Continued)

orientation information, wherein the orientation dependence information update unit 52 does not update the pieces of orientation dependence information, when the pieces of orientation information do not change.

6 Claims, 12 Drawing Sheets

FIG. 4

| CHECK TARGET SET: N-1-TH MACHINE ELEMENT AND N-TH MACHINE ELEMENT | | | |
|---|---|---|---|
| SEPARATION AXIS CANDIDATE VECTOR | VECTOR VALUE | RADIUS VECTOR r1 IN SEPARATION AXIS DIRECTION | RADIUS VECTOR r2 IN SEPARATION AXIS DIRECTION |

| CHECK TARGET SET: FIRST MACHINE ELEMENT AND SECOND MACHINE ELEMENT | | | |
|---|---|---|---|
| SEPARATION AXIS CANDIDATE VECTOR | VECTOR VALUE | RADIUS VECTOR r1 IN SEPARATION AXIS DIRECTION | RADIUS VECTOR r2 IN SEPARATION AXIS DIRECTION |
| 1 | (a1,b1,c1) | d1 | e1 |
| 2 | (a2,b2,c2) | d2 | e2 |
| ... | ... | ... | ... |
| m | (am,bm,cm) | dm | em |

FIG. 8

| m-TH CHECK TARGET SET | | | |
|---|---|---|---|
| COMBINATION NUMBER | INTERFERENCE CANDIDATE SURFACE | INTERFERENCE CANDIDATE SIDE | VECTOR VALUE OF BASIS VECTOR IN OBLIQUE COORDINATE SYSTEM |
| 1 | 1 | 1 | $X(*,*,*)/Y(*,*,*)/Z(*,*,*)$ |
| 2 | 1 | 2 | $X(\#,\#,\#)/Y(\#,\#,\#)/Z(\#,\#,\#)$ |
| ... | ... | ... | ... |
| Nm × Mm | Nm | Mm | $X(\%,\%,\%)/Y(\%,\%,\%)/Z(\%,\%,\%)$ |

NUMERICAL CONTROL SYSTEM

TECHNICAL FIELD

The present disclosure relates to a numerical control system.

BACKGROUND ART

A numerical controller moves, based on a numerical control program created in advance, a plurality of machine elements (for example, tools, tables, and jigs for holding workpieces) constituting a machine tool along a plurality of control axes to perform machining on a workpiece. Further, the numerical controller has an interference check function that performs interference check computation in parallel during machining by the machine tool to check whether the machine elements of the machine tool are interfering with each other (for example, see Patent Document 1).

In the technique disclosed in Patent Document 1, the presence or absence of interference is determined based on a so-called separating axis method of determining the presence or absence of interference based on the presence or absence of a separation plane for separating two target machine elements and a separation axis orthogonal to the separation plane. Since whether such a separation plane and separation axis can be defined between the two machine element requires information on a position and an attitude of each of the machine elements, calculation about the separation axis is performed in the technique disclosed in Patent Document 1 after position information on the position and attitude information on the attitude of each of the machine elements are acquired in a predetermined control period.
Patent Document 1: Japanese Patent No. 5857803

DISCLOSURE OF THE INVENTION

Problems to be Solved by the Invention

By the way, a conventional numerical controller performs interference check computation using shape information on shape of machine elements, position information on positions of the machine elements, and attitude information on attitudes of the machine elements to determine whether two machine elements constituting a predetermined check target set are interfering with each other. In the numerical controller, since it is necessary to perform such interference check computation on a plurality of check target sets, it may take a time.

Therefore, as the number of check target sets increases, there is a possibility that the numerical controller cannot completely perform the interference check computation on all of the check target sets within a control period of the machine tool. Moreover, for this reason, the interference between the machine elements may not be detected at appropriate timing.

The present disclosure has been made in view of the above problems, and is to provide a numerical control system that assist interference check computation in a numerical controller such that the interference check computation can be completed in a short time.

Means for Solving the Problems

An aspect of the present disclosure provides a numerical control system that causes a plurality of machine elements of a machine tool to move along a plurality of axes based on a movement command and performs an interference check computation between two machine elements constituting a predetermined check target set, the numerical control system including: an attitude dependency information storage unit that stores attitude dependency information which is information dependent on a shape and an attitude of each of the two machine elements constituting the check target set; an interference check unit that acquires position information of each of the machine elements and performs the interference check computation based on the position information and the attitude dependency information stored in the attitude dependency information storage unit; and an attitude dependency information update unit that acquires shape information and attitude information of each of the machine elements and updates the attitude dependency information based on the shape information and the attitude information, the attitude dependency information update unit being configured to not update the attitude dependency information when the attitude information does not change.

Effects of the Invention

According to the aspect of the present disclosure, the attitude dependency information storage unit stores the attitude dependency information, which is information dependent on the shape and the attitude of each of the two machine elements constituting the check target set, as part of the information necessary to perform the interference check computation. The interference check unit acquires the position information of the machine element that moves under the movement command, and performs the interference check computation based on the position information and the attitude dependency information stored in the attitude dependency information storage unit. Further, the attitude dependency information update unit acquires the shape information and the attitude information of the machine element, updates the attitude dependency information stored in the attitude dependency information storage unit based on the shape information and the attitude information, and does not update the attitude dependency information when the attitude information does not change. Therefore, according to the aspect of the present disclosure, the interference check unit can reuse the attitude dependency information stored in the attitude dependency information storage unit to perform the interference check computation as long as the attitude information of the machine element does not change. Therefore, according to the aspect of the present disclosure, since there is no need to recalculate the attitude dependency information each time the interference check computation is performed, the interference check computation in the interference check unit can be completed in a short time.

BRIEF DESCRIPTION OF THE DRAWINGS

FIG. 4 is a diagram showing an example of attitude dependency information according to the first embodiment;

FIG. 8 is a diagram showing an example of attitude dependency information generated by an attitude dependency information update unit according to the second embodiment;

PREFERRED MODE FOR CARRYING OUT
THE INVENTION

First Embodiment

A numerical control system according to a first embodiment of the present disclosure will be described below with reference to the drawings.

Figure 1:
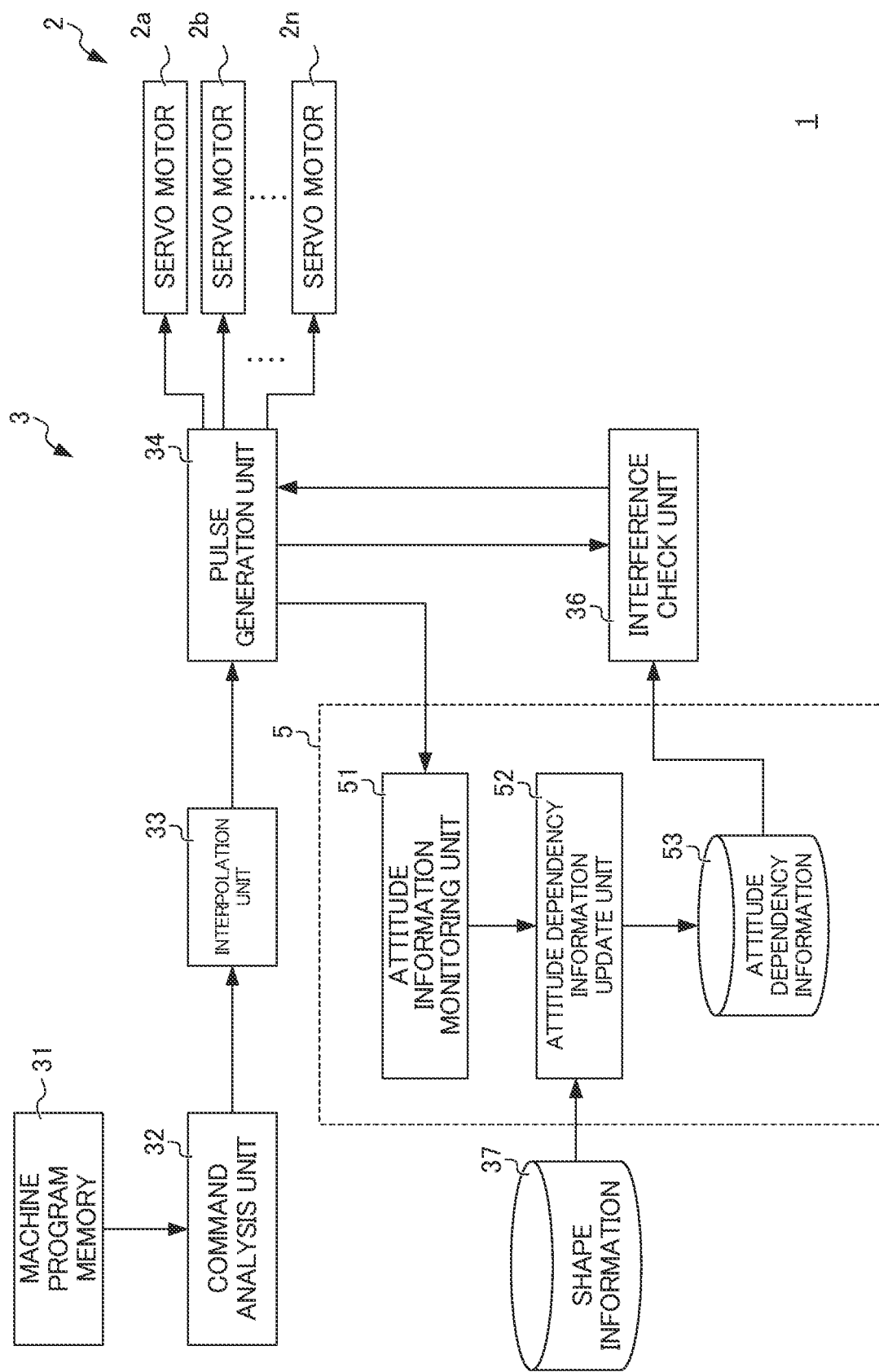
FIG. 1 is a schematic diagram of a numerical control system according to a first embodiment of the present disclosure.

FIG. 1 is a schematic diagram of a numerical control system 1 according to the present embodiment.

The numerical control system 1 includes a machine tool 2 and a numerical controller (CNC) 3 that controls the machine tool 2.

The machine tool 2 includes a plurality of machine elements, for example, a tool, a table, a support for supporting the tool, and a jig for holding a workpiece, having a predetermined three-dimensional shape, and a plurality of servo motors 2a, 2b, . . . , and 2n that moves the machine elements along a plurality of control axes. The machine tool 2 drives the plurality of servo motors 2a, . . . , and 2n based on movement pulses transmitted from the numerical controller 3, and machines a workpiece (not shown) by moving the plurality of machine elements along the plurality of control axes. Here, examples of the machine tool 2 include a lathe, a drilling machine, a milling machine, a grinding machine, a laser processing machine, and an injection molding machine, but are not limited thereto.

Figure 2:
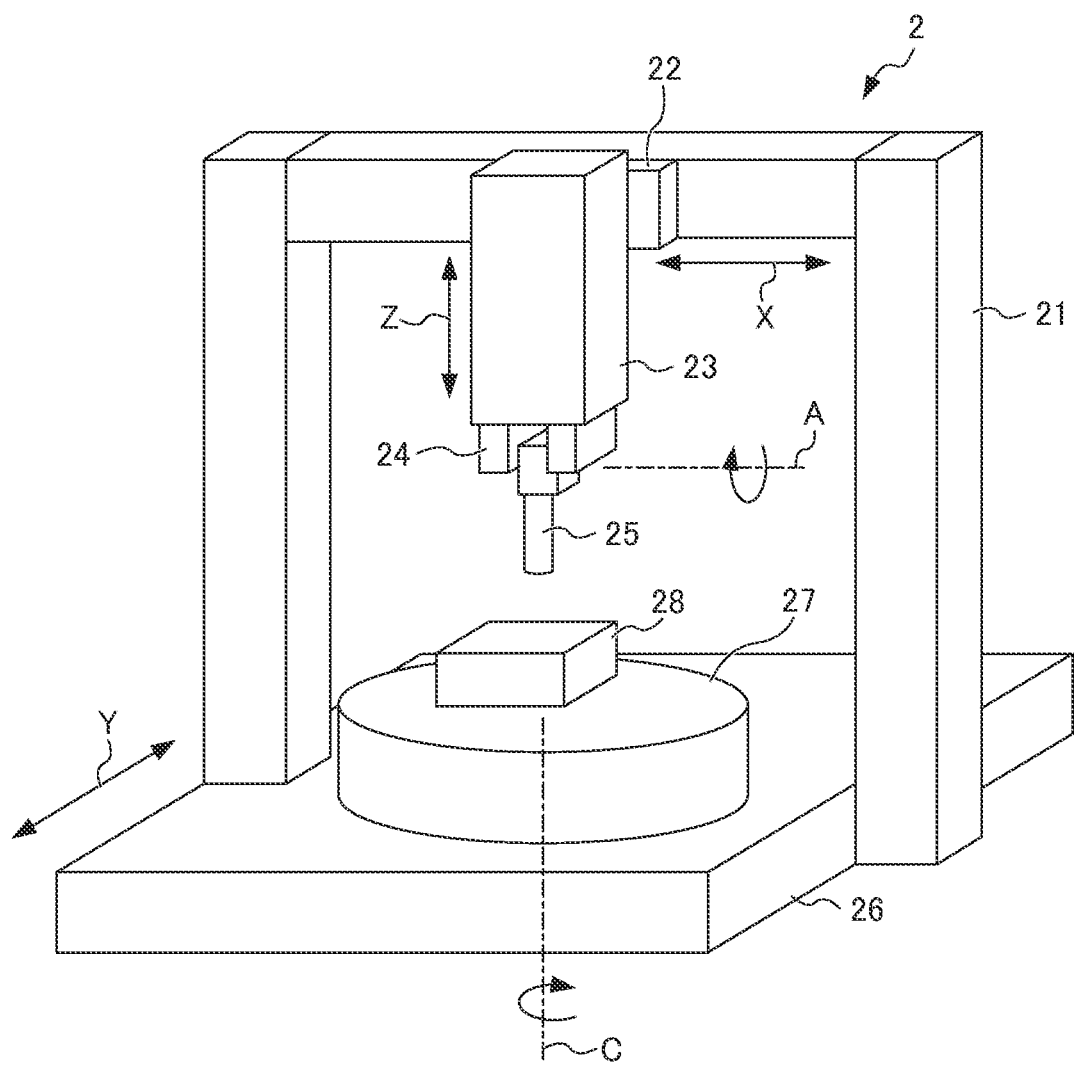
FIG. 2 is a diagram showing an example of a machine tool.

FIG. 2 is a diagram showing an example of the machine tool 2. The machine tool 2 shown in FIG. 2 can move eight machine elements 21, 22, 23, 24, 25, 26, 27, and 28 along five control axes X, Y, Z, A, and C.

The eighth machine element 28 is a jig that supports a workpiece (not shown). The seventh machine element 27 is a table that supports the eighth machine element 28. The sixth machine element 26 is a base that support the seventh machine element 27 and the eighth machine element 28 so as to be rotatable around the control axis C extending in a vertical direction, for example.

The fifth machine element 25 is a tool that machines the workpiece supported by the eighth machine element 28. The fourth machine element 24 is a support that supports the fifth machine element 25 at a tip thereof so as to be rotatable around the control axis A extending along a horizontal plane.

The third machine element 23 is a support that supports a base end of the fourth machine element 24 at a tip thereof. The second machine element 22 is a support that supports the machine elements 23 to 25 so as to be movable along the control axis Z in the vertical direction.

The first machine element 21 is a support that supports the machine elements 22 to 25 so as to be movable along the control axis X extending along the horizontal plane. Further, the first machine element 21 is supported by the eighth machine element 28 so as to be movable along the control axis Y orthogonal to the control axis X in the horizontal plane.

In the five-axis machine tool 2 shown in FIG. 2, when the fifth machine element 25 moves along the control axis A, an attitude of the fifth machine element 25 changes. Further, when the seventh machine element 27 and the eighth machine element 28 move along the control axis C, attitudes of the seventh machine element 27 and the eighth machine element 28 change. Although the configuration of the numerical controller 3 will be described below using the five-axis machine tool 2 as shown in FIG. 2 as an example, the present disclosure is not limited thereto.

Returning to FIG. 1, the numerical controller 3 is a computer configured by hardware including a computation processing unit such as a CPU (Central Processing Unit), an auxiliary storage unit such as an HDD (Hard Disk Drive) or an SSD (Solid State Drive) for storing various programs, a main storage unit such as a RAM (Random Access Memory) for storing data temporarily required for execution of the programs by the computation processing unit, an operation unit such as a keyboard for an operator to perform various operations, and a display unit such as a display for displaying various information to the operator.

The numerical controller 3 uses the configurations of hardware to implement various functions of a machining program memory 31, a command analysis unit 32, an interpolation unit 33, a pulse generation unit 34, an interference check unit 36, a machine element shape storage unit 37, and an interference check pre-processing device 5.

The machining program memory 31 stores a numerical control program including a command to move (including translational movement and rotational movement) the machine elements of the machine tool 2 along the control axes. The numerical control program is written in a predetermined program language (for example, a G code).

The command analysis unit 32 reads and analyzes the numerical control program, which is stored in the machining program memory 31, by each block, and generates movement command data for commanding movement along the control axis of the machine tool 2 based on the analysis result. The command analysis unit 32 transmits the generated movement command data to the interpolation unit 33.

The interpolation unit 33 generates, based on the movement command data transmitted from the command analysis unit 32, interpolated data obtained by interpolation calculation of points on a command path at a predetermined interpolation period. The interpolation unit 33 transmits the generated interpolated data to the pulse generation unit 34.

The pulse generation unit 34 generates, based on the interpolated data transmitted from the interpolation unit 33, movement commands for the machine tool 2, that is, movement pulses for the servo motors 2a, . . . , and 2n of the machine tool 2 for each of the aforementioned interpolation periods. The pulse generation unit 34 inputs the movement pulses generated as described above to the servo motors 2a, ..., and 2n to move the plurality of machine elements of the machine tool 2 along the plurality of control axes. Further, when it is determined based on interference check computation (to be described below) in the interference check unit 36 that any one of the plurality of machine elements interferes, the pulse generation unit 34 stops the generation of the movement pulse and the input to the machine tool 2 so as to prevent such interference beforehand.

In addition, the pulse generation unit 34 generates the movement pulse for each interpolation period based on the interpolated data as described above, and transmits the movement pulse scheduled to be input to the machine tool 2 in the current interpolation period to the interference check unit 36 and the interference check pre-processing device 5 before inputting it to the machine tool 2.

In the present embodiment as described above, a machine control unit for causing the plurality of machine elements of the machine tool 2 to move along the plurality of control axes based on the movement pulses is configured by the machining program memory 31, the command analysis unit 32, the interpolation unit 33, and the pulse generation unit 34.

In the following description, a case will be described in which the movement pulses to be input to the machine tool 2, the interference check unit 36, and the interference check pre-processing device 5 are automatically generated based on the numerical control programs stored in the machining program memory 31, in other words, in which the movement pulses are generated based on an automatic operation in the numerical controller 3, but the present invention is not limited thereto. The movement pulses to be input to the machine tool 2, the interference check unit 36, and the interference check pre-processing device 5 may also be generated every predetermined interpolation period based on a manual operation of the numerical controller 3 by an operator.

The machine element shape storage unit 37 stores shape information regarding a shape of each of the plurality of machine elements constituting the machine tool 2. More specifically, the machine element shape storage unit 37 stores, as shape information, data required for calculating attitude dependency information which will be described below, for example, surface data of each surface when the shape of each of the machine elements is approximated by a convex polyhedron and data regarding normal vectors of each surface.

As described above, when movement pulses having the same interpolation period as the movement pulses input from the pulse generation unit 34 to the machine tool 2 are input to the interference check unit 36 and the interference check pre-processing device 5, it is preferable to add a slight margin to the shape information stored in the machine element shape storage unit 37 such that interference does not occur immediately even when it is assumed that the interference check unit 36 cannot complete the interference check computation within the interpolation period. In other words, the shape information stored in the machine element shape storage unit 37 is preferably created based on the machine element that is slightly larger than the actual machine element.

When the movement pulse generated by the pulse generation unit 34 is continuously input to the machine tool 2 as described above, the interference check unit 36 performs the interference check computation on a plurality of check target sets to determine whether interference occurs between the plurality of machine elements constituting the machine tool 2. Here, the check target set is configured by a combination of two machine elements selected from the plurality of machine elements constituting the machine tool 2. Therefore, when the total number of machine elements constituting the machine tool 2 is N, the total number of check target sets is N (N−1)/2.

The interference check unit 36 calculates position information on a position of each of the machine elements in the machine tool 2 under the control of the above-described machine control unit, based on the movement command to the machine tool 2, more specifically, the movement pulse transmitted from the pulse generation unit 34 every interpolation period, and performs the interference check computation on each of the check target sets based on the calculated position information and attitude dependency information (which will be described below) generated in advance by the interference check pre-processing device 5 When determining by the interference check computation that the interference occurs in any check target set, the interference check unit 36 notifies the pulse generation unit 34 of the fact, and stops the generation of the movement pulse and the input to the machine tool 2 before the interference occurs.

Figure 3:
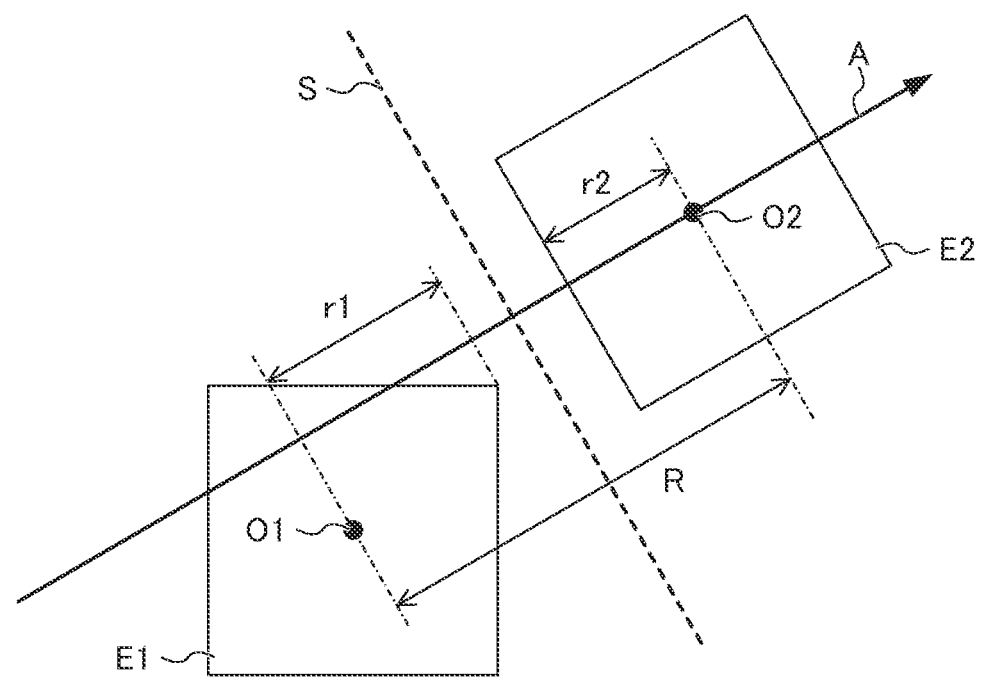
FIG. 3 is a diagram for explaining an algorithm for an interference check computation according to the first embodiment.

FIG. 3 is a diagram for explaining an algorithm for the interference check computation in the interference check unit 36 according to the present embodiment. In the following description, a case will be described for ease of understanding in which two machine elements E1 and E2 to be a check target set are two-dimensional squares. Further, since generalization to three dimensions is easy, a detailed description will not be given. Further, a case will be described below in which the machine element has a convex shape.

As shown in FIG. 3, when the two machine elements E1 and E2 are separated from each other and do not interfere with each other, a separation plane S (a separation line in the case of the two-dimension) separating the two machine elements E1 and E2 and a separation axis A orthogonal to the separation plane S can be defined. In other words, when there is no separation axis A with the separation plane S separating the two machine elements E1 and E2, it can be determined that the machine elements E1 and E2 are interfering.

Further, when there is the separation axis A having the above properties for the two machine elements E1 and E2, a length R (hereinafter, also referred to as a "interval in a separation axis direction") along the separation axis A between a reference points O1 and O2 defined at arbitrary positions (for example, centers) inside the machine elements E1 and E2 is longer than the sum of a radius r1 (hereinafter, also referred to as a "radius in a separation axis direction") of the machine element E1 when the machine element E1 is projected onto the separation axis A and a radius r2 of the machine element E2 in the separation axis direction.

The interference check unit 36 performs an interference check computation on the two machine elements constituting the check target set to determine whether there is a separation axis having the property of making the interval R in the separation axis direction larger than the sum of the radii r1 and r2 in the separation axis direction (hereinafter, also referred to as a "separation property"), thereby determining the presence or absence of interference between the two machine elements.

Returning to FIG. 1, the interference check pre-processing device 5 includes an attitude information monitoring unit 51, an attitude dependency information update unit 52, and an attitude dependency information storage unit 53, and uses these components to generate attitude dependency information that is referred to by the interference check unit 36.

The attitude information monitoring unit 51 monitors the attitude information on the attitude of each of the machine elements of the machine tool 2, based on the movement command to the machine tool 2, more specifically, the movement pulse transmitted from the pulse generation unit 34 every interpolation period. The attitude information monitoring unit 51 calculates the attitude information on the attitude of each of the machine elements of the machine tool 2 based on the movement pulse transmitted from the pulse generation unit 34, and determines whether the attitude information changes. More specifically, the attitude information monitoring unit 51 compares the attitude information calculated based on the movement pulse in the previous interpolation period with the attitude information calculated based on the movement pulse in the current interpolation period to determine whether the attitude information of each of the machine elements changes.

In the five-axis machine tool 2 as shown in FIG. 2, the attitude of the machine element 25 changes as the control axis A moves, and the attitudes of the seventh machine element 27 and the eighth machine element 28 change as the control axis C moves. Therefore, the attitude information monitoring unit 51 determines, in the example of the machine tool 2 shown in FIG. 2, that the attitude information changes when the movement pulse is a command that accompanies the movement of the control axis A or the control axis C. When determining that the attitude information changes according to the above-described procedure, the attitude information monitoring unit 51 transmits the fact and the attitude information after the change to the attitude dependency information update unit 52.

The attitude dependency information storage unit 53 stores the attitude dependency information generated by the attitude dependency information update unit 52 in the following procedure for each check target set subjected to the interference check computation in the interference check unit 36.

The attitude dependency information update unit 52 generates new attitude dependency information based on the shape information of each of the machine elements stored in the machine element shape storage unit 37 and the attitude information transmitted from the attitude information monitoring unit 51, causes the attitude dependency information storage unit 53 to store the generated information, and updates the attitude dependency information stored in the attitude dependency information storage unit 53.

Here, the attitude dependency information is information that depends on the shape and the attitude of each of two machine elements constituting the check target set and that does not depend on the position of each of the machine elements, and is defined for each check target set. In other words, the attitude dependency information changes when a relative attitude of the two machine elements constituting the check target set and the shape of each of the machine elements change. Further, the attitude dependency information does not change even when the positions of the machine elements change, unless the relative attitude of the two machine elements constituting the check target set and the shape of each of the machine elements change.

Next, contents of the attitude dependency information in the present embodiment will be described in detail. As described with reference to FIG. 3, in the interference check computation in the interference check unit 36, it is determined whether there is the separation axis having the separation property with respect to the two machine elements constituting the check target set, whereby it is determined whether the two machine elements interfere with each other. However, a lot of computations are generally required to confirm the presence or absence of such separation axis. Therefore, the numerical controller 3 decides a predetermined finite number of candidates for the separation axis, which are considered to have a high possibility of having the separation property, for each check target set. Then, the interference check unit 36 determines whether only the finite number of candidates for the separation axis have the above-described separation property, thereby determining whether the two machine elements interfere with each other. Further, as described with reference to FIG. 4, the attitude dependency information update unit 52 generates the attitude dependency information including the information on these separation axis candidates to complete the interference check computation in the interference check unit 36 in a short time.

FIG. 4 is a diagram showing an example of the attitude dependency information generated by the attitude dependency information update unit 52. As shown in FIG. 4, the attitude dependency information includes vector values of a plurality of separation axis candidate vectors defined for each of the check target sets and respective radii r1 and r2 in the separation axis direction of two components constituting the check target set. Here, the number of separation axis candidate vectors is appropriately determined according to the shapes and the relative attitudes of the machine elements constituting the check target set.

Figure 5A:
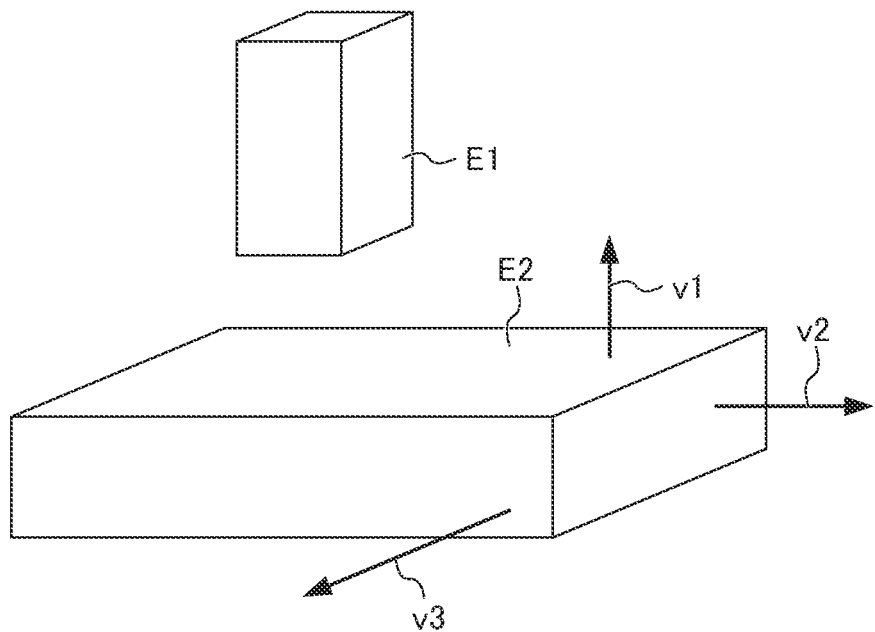
FIG. 5A shows an example of a separation axis candidate vector.

For example, as shown in FIG. 5A, when both of two machine elements E1 and E2 constituting a check target set have a rectangular parallelepiped shape and have surfaces parallel to each other, the number of separation axis candidate vectors may be 3. In other words, the separation axis candidate vectors can use three independent normal vectors v1, v2, and v3 among a total of six normal vectors defined for the two machine elements E1 and E2.

Figure 5B:
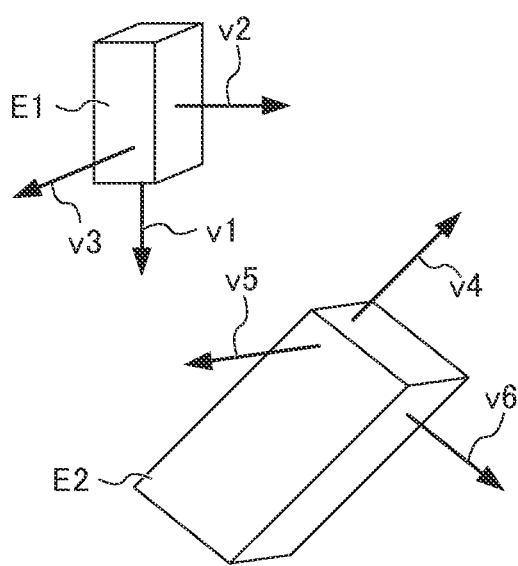
FIG. 5B shows another example of a separation axis candidate vector.

For example, as shown in FIG. 5B, when both of two machine elements E1 and E2 constituting a check target set have a rectangular parallelepiped shape and have surfaces non-parallel to each other, the number of separation axis candidate vectors may be 15. In other words, the separation axis candidate vectors can use three mutually orthogonal normal vectors v1, v2, and v3 defined for one machine element E1, three mutually orthogonal normal vectors v4, v5, and v6 defined for the other machine element E2, and all combinations (9 in total) of cross products of any of the normal vectors v1, v2, and v3 for one machine element E1 and any of the normal vectors v4, v5, and v6 for the other machine element E2.

As described above, as the separation axis candidate vectors for each of the check target sets, a plurality of normal vectors determined for each of the machine elements constituting the check target set and vectors generated by a cross product of these normal vectors are used. The attitude dependency information update unit 52 calculates the vector values of the plurality of separation axis candidate vectors defined for each of the check target sets as described above and the radii r1 and r2 in the separation axis direction of the two machine elements constituting the check target set along the separation axis candidate vectors, based on the attitude information transmitted from the attitude information monitoring unit 51 and the shape information stored in the machine element shape storage unit 37.

Returning to FIG. 1, the attitude dependency information update unit 52 generates, for each of the check target sets, the above-described attitude dependency information including the vector values of the plurality of separation axis candidate vectors and the two radii in the separation axis direction for each of the separation axis candidate vectors, based on the shape information of each of the machine elements stored in machine element shape storage unit 37 and the attitude information of each of the machine elements transmitted from the attitude information monitoring unit 51 at the timing when the attitude information monitoring unit 51 determines that the attitude information changes, and causes the attitude dependency information storage unit 53 to store the generated attitude dependency information.

Further, the vector values of the separation axis candidate vectors and the two radii in the separation axis direction for each of the separation axis candidate vectors defined for each of the check target sets as described above change as the shapes and the relative attitudes of the machine elements constituting the check target set change. In addition, the vector values of the separation axis candidate vectors and the two radii in the separation axis direction do not change even when positions of the machine elements change, unless the shapes and the relative attitudes of the machine elements constituting the check target set change.

Therefore, when the attitude information monitoring unit 51 determines that the attitude information does not change, the attitude dependency information update unit 52 does not update the attitude dependency information stored in the attitude dependency information storage unit 53. Further, when the attitude information monitoring unit 51 determines that the attitude information changes, the attitude dependency information update unit 52 updates the attitude dependency information stored in the attitude dependency information storage unit 53. More specifically, in this case, the attitude dependency information update unit 52 updates the attitude dependency information (more specifically, the vector values of the separation axis candidate vectors and the two radii r1 and r2 in the separation axis direction for each of the separation axis candidate vectors) for the check target set including the machine element of which attitude changes, among the attitude dependency information for all of the check target sets stored in the attitude dependency information storage unit 53, and does not update the attitude dependency information for the check target set not including the machine element of which attitude change.

Figure 6A:
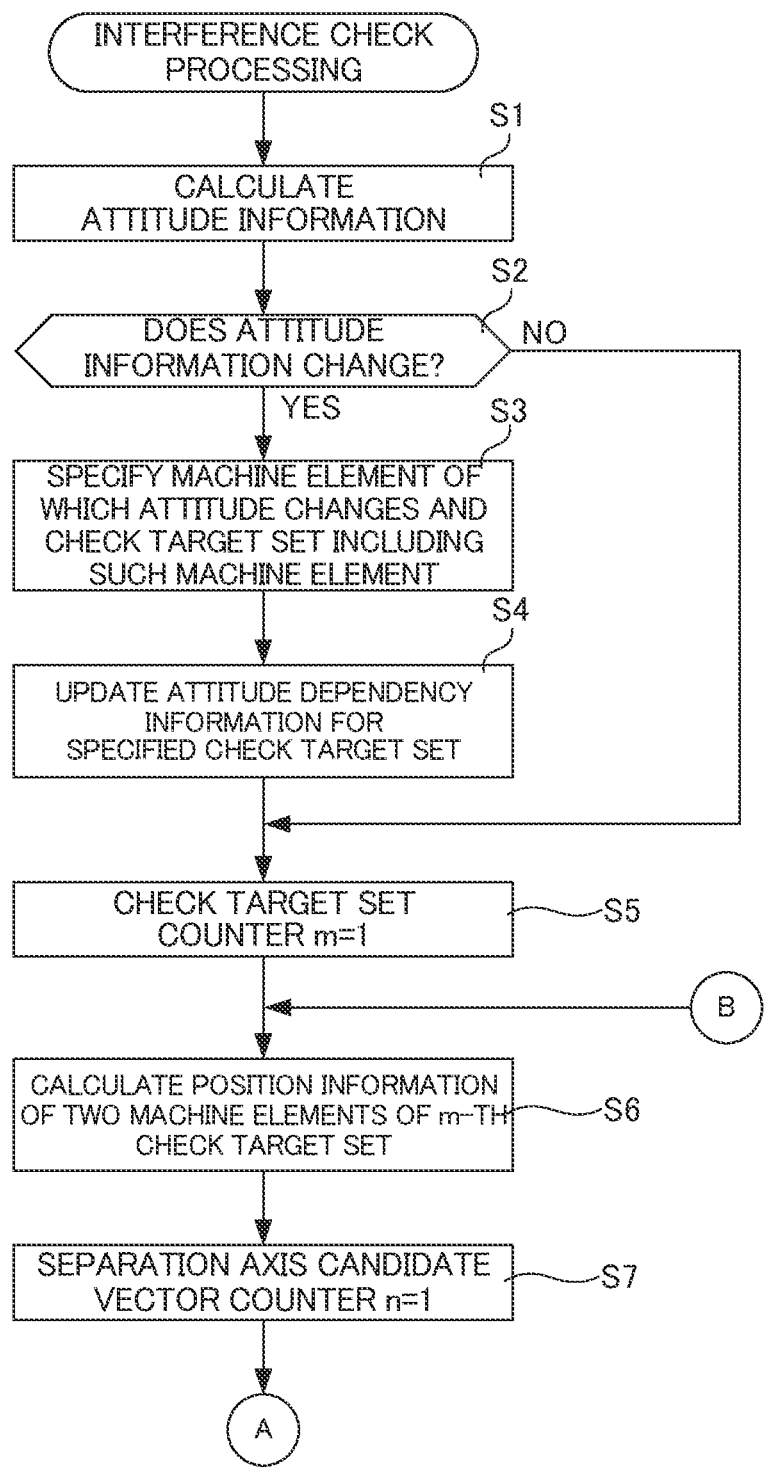
FIG. 6A is a flowchart showing a specific procedure of interference check processing in a numerical controller (Part 1)
Figure 6B:
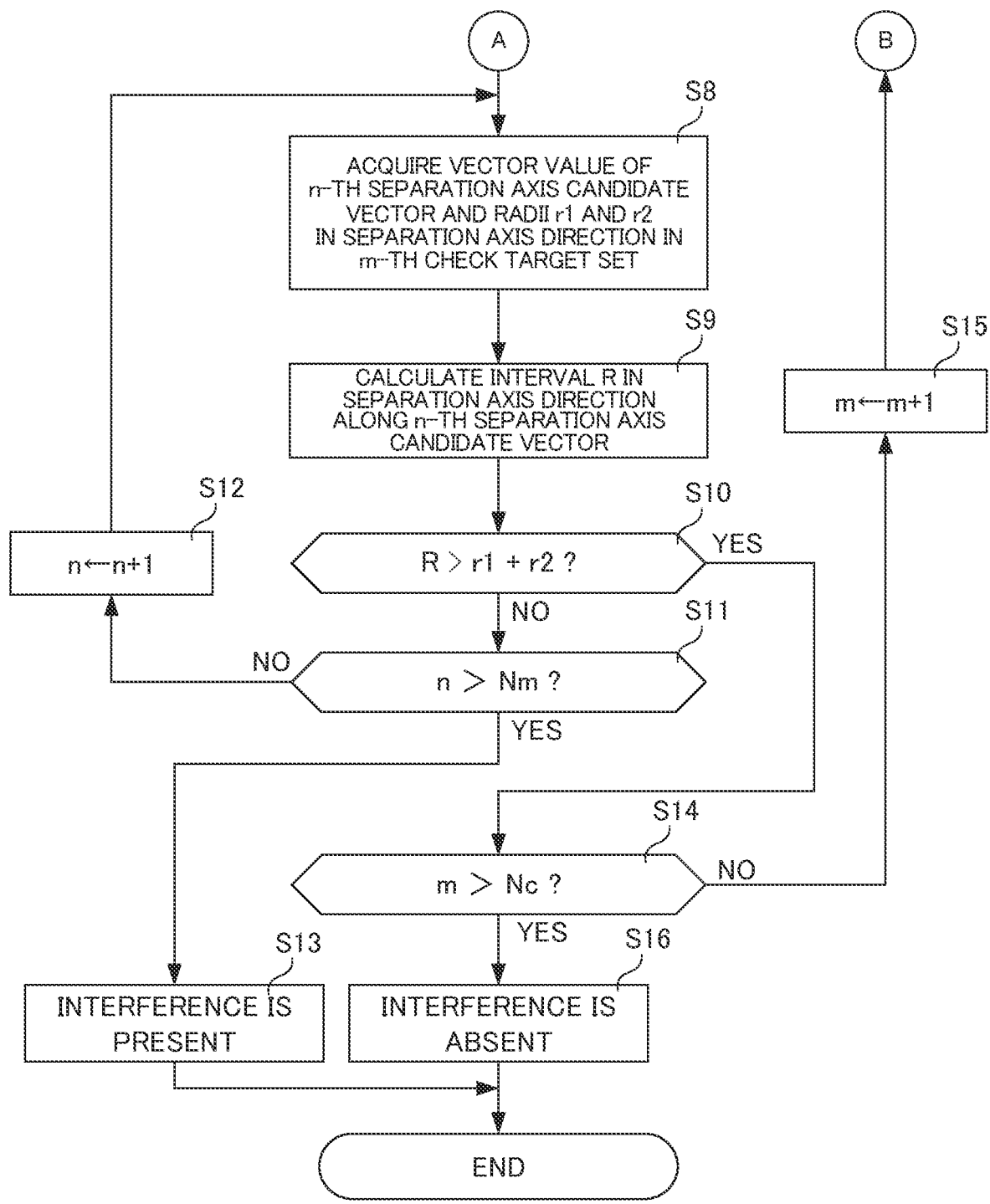
FIG. 6B is a flowchart showing a specific procedure of interference check processing in the numerical controller (Part 2)

FIGS. 6A and 6B are flowcharts showing specific procedures of interference check processing in the numerical controller 3. The interference check processing shown in FIGS. 6A and 6B is repeatedly executed by the interference check pre-processing device 5 and the interference check unit 36 every interpolation period as the machine control unit starts to control the machine tool 2. At the time of starting the interference check processing in FIGS. 6A and 6B, the attitude dependency information storage unit 53 stores the attitude dependency information generated in advance by the attitude dependency information update unit 52 according to the initial attitude of each of the machine elements at the start of control by the machine control unit. In the following description, a total number of check target sets subjected to the interference check computation is set as Nc (Nc being an arbitrary integer equal to or greater than 1), and a total number of separation axis candidate vectors defined for an m-th check target set is set as Nm.

In S1, the attitude information monitoring unit 51 calculates the attitude information of each of the machine elements based on the movement pulse transmitted from the pulse generation unit 34, and the process proceeds to S2. In S2, the attitude information monitoring unit 51 compares the attitude information calculated during the previous interpolation period with the attitude information calculated during the current interpolation period to determine whether the attitude information of each of the machine elements changes. When the attitude information monitoring unit 51 determines to be YES in S2, the process proceeds to S3.

In S3, the attitude dependency information update unit 52 specifies, based on the attitude information transmitted from the attitude information monitoring unit 51, the machine element of which attitude changes among the plurality of machine elements and the check target set including the machine element of which attitude changes, and the process proceeds to S4.

In S4, the attitude dependency information update unit 52 acquires the attitude information transmitted from the attitude information monitoring unit 51 and the shape information stored in the machine element shape storage unit 37, and updates, based on the attitude information and the shape information, the attitude dependency information stored in the attitude dependency information storage unit 53, and then the process proceeds to S5. More specifically, the attitude dependency information update unit 52 recalculates, based on the acquired attitude information and shape information, the attitude dependency information (the vector values of the plurality of separation axis candidate vectors and two radii r1 and r2 in the separation axis direction along the separation axis candidate vectors) for the check target set specified in S3, and updates the attitude dependency information stored in the attitude dependency information storage unit 53 according to the result of the recalculation.

When the determination result in S2 is NO, that is, when the attitude information does not change, the attitude dependency information update unit 52 does not execute the processes of S3 and S4, that is, does not update the attitude dependency information stored in the attitude dependency information storage unit 53, and then the process proceeds to S5.

In S5, the interference check unit 36 sets a value of a check target set counter m to 1, and then the process proceeds to S6. In S6, the interference check unit 36 calculates, based on the movement pulse transmitted from the pulse generation unit 34, position information of the two machine elements constituting the m-th check target set, and then the process proceeds to S7. In S7, the interference check unit 36 sets a value of a separation axis candidate vector counter n to 1, and then the process proceeds to S8.

In S8, the interference check unit 36 acquires a vector value of an n-th separation axis candidate vector in the m-th check target set and two radii r1 and r2 in the separation axis direction along the n-th separation axis candidate vector from the attitude dependency information storage unit 53, and then the process proceeds to S9.

In S9, the interference check unit 36 calculates an interval R in the separation axis direction along the n-th separation axis candidate vector between the two machine elements, based on the position information of the two machine elements constituting the m-th check target set acquired in S6 and the vector value of the n-th separation axis candidate vector in the m-th check target set acquired in S8, and then the process proceeds to S10.

In S10, the interference check unit 36 determines whether the interval R in the separation axis direction calculated in S9 is greater than the sum of the two radii r1 and r2 in the separation axis direction acquired in S8 (R>r1+r2?).

When it is determined to be NO in S10, the process proceeds to S11, and then the interference check unit 36 determines whether the value of the separation axis candidate vector counter n is greater than the total number Nm of separation axis candidate vectors defined for the m-th check target set. When it is determined to be NO in S11, the interference check unit 36 counts up the value of the separation axis candidate vector counter n by one (see S12) in order to try the next separation axis candidate vector, and then the process returns to S8. When it is determined to be YES in S11, that is, when it is determined that all of the separation axis candidate vectors do not have the separation property (see S10), the interference check unit 36 determines that interference occurs between the two machine elements constituting the m-th check target set (see S13), and then the interference check processing ends. In addition, when it is determined that interference occurs in any of 1 to Nc-th check target sets, the interference check unit 36 notifies the pulse generation unit 34 of the fact, and stops the generation of the movement pulse and the input to the machine tool 2 before the interference actually occurs.

Further, when it is determined to be YES in S10, the interference check unit 36 determines that at least the n-th separation axis candidate vector has the separation property in the m-th check target set, and then the process proceeds to S14. In S14, the interference check unit 36 determines whether the value of the check target set counter m is greater than the total number Nc of check target sets. When it is determined to be NO in S14, the interference check unit 36 counts up the value of the check target set counter by one (see S15) in order to determine the presence or absence of interference in the next check target set, and then the process returns to S6. When it is determined to be YES in S14, the interference check unit 36 determines that interference does not occurs in all of the 1 to Nc-th check target sets (see S16), and then the interference check processing ends.

According to the present embodiment, the following effects are achieved. According to the present embodiment, the attitude dependency information storage unit 53 stores the attitude dependency information, which is information dependent on the shape and the attitude of each of the two machine elements constituting the check target set, as part of the information necessary to perform the interference check computation. The interference check unit 36 acquires the position information of the machine element that moves under the movement pulse, and performs the interference check computation based on the position information and the attitude dependency information stored in the attitude dependency information storage unit 53. Further, the attitude dependency information update unit 52 acquires the shape information and the attitude information of the machine element, updates the attitude dependency information stored in the attitude dependency information storage unit 53 based on the shape information and the attitude information, and does not update the attitude dependency information when the attitude information does not change. Therefore, according to the present embodiment, the interference check unit 36 can reuse the attitude dependency information stored in the attitude dependency information storage unit 53 to perform the interference check computation as long as the attitude information of the machine element does not change. Therefore, according to the present embodiment, since there is no need to recalculate the attitude dependency information each time the interference check computation is performed, the interference check computation in the interference check unit 36 can be completed in a short time.

According to the present embodiment, the attitude dependency information storage unit 53 stores, as attitude dependency information, the information that depends on the shape and the attitude of each of the two machine elements constituting the check target set without depending on the position of each of the machine elements. In other words, the attitude dependency information does not change even when the positions of the machine elements change, unless the relative attitude of the two machine elements constituting the check target set and the shape of each of the machine elements change. According to the present embodiment, the attitude dependency information storage unit 53 stores the attitude dependency information defined in this manner, and thus in the numerical controller 3 having many rectilinear axes (for example, in the example of the machine tool 2 shown in FIG. 2, control axes such as control axes X, Y, and Z along which the machine elements translate), it is possible to particularly reduce the number of updates of attitude dependency information.

According to the present embodiment, the attitude information monitoring unit 51 monitors the attitude information of each of the machine elements, based on the movement command to the machine tool 2, more specifically, the movement pulse transmitted from the pulse generation unit 34 every interpolation period, and the attitude dependency information update unit 52 updates the attitude dependency information stored in the attitude dependency information storage unit 53 when the attitude information monitoring unit 51 determines that the attitude information changes. Thus, the attitude dependency information update unit 52 can update the attitude dependency information at an appropriate timing when the attitude of the machine element changes.

According to the present embodiment, the attitude dependency information storage unit 53 stores the attitude dependency information for each check target set, and when the attitude information changes, the attitude dependency information update unit 52 updates the attitude dependency information for the check target set including the machine element of which attitude changes and does not update the attitude dependency information for the check target set not including the machine element of which attitude changes. Thus, the amount of calculation in the attitude dependency information update unit 52 can be minimized. Further, this can allow the interference check computation in the interference check unit 36 to be completed in a short time.

According to the present embodiment, the attitude dependency information storage unit 53 stores, as attitude dependency information, the vector values of the plurality of separation axis candidate vectors defined for each check target set and the radii r1 and r2 in the separation axis direction which are radii when the two machine elements constituting the check target set are projected onto the separation axis candidate vectors, and the interference check unit 36 determines in the interference check computation whether the plurality of separation axis candidate vectors prepared in advance have the separation property, and thus determines the presence or absence of interference. According to the present embodiment, it is possible to efficiently determine the presence or absence of interference with a small number of computations.

Second Embodiment

A numerical control system according to a second embodiment of the present disclosure will be described below. The numerical control system according to the present embodiment differs from the numerical control system 1 according to the first embodiment in terms of the algorithm for the interference check computation in the interference check unit and the contents of the attitude dependency information generated by the interference check pre-processing device. In the following description of the numerical control system according to the second embodiment, the same components as those of the numerical control system 1 according to the first embodiment will not be described in detail.

Figure 7:
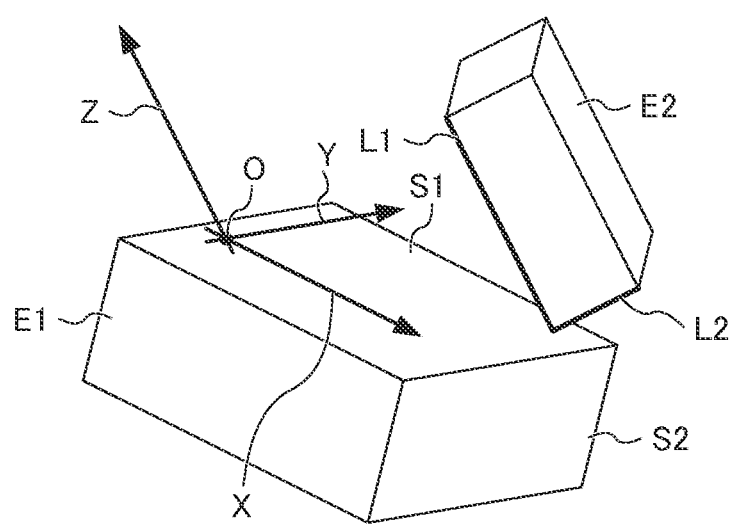
FIG. 7 is a diagram for explaining an algorithm for an interference check computation in an interference check unit according to a second embodiment of the present disclosure.

FIG. 7 is a diagram for explaining an algorithm for an interference check computation in an interference check unit according to the present embodiment. As shown in FIG. 7, the interference check unit determines the presence or absence of interference between two machine elements E1 and E2 constituting a check target set depending on the presence or absence of interference between a surface S1 of one machine element E1 and a side L1 of the other machine element E2. More specifically, the interference check unit defines, in the interference check computation, an oblique coordinate system having an origin O in the surface S1 of one machine element E1 of the two machine elements E1 and E2 constituting the check target set. In the oblique coordinate system, two axes orthogonal to each other in a plane parallel to the surface S1 of one machine element E1 are defined as an X-axis and a Y-axis, respectively, and an axis parallel to the side L1 of the other machine element E2 is defined as a Z-axis. In the interference check computation, the presence or absence of interference between the surface S1 and the side L1 is determined based on coordinate values of the side L1 of the other machine element E2 in the oblique coordinate system defined in this manner.

In the numerical controller according to the present embodiment, a plurality of surfaces S1, S2, . . . and a plurality of sides L1, L2, . . . that may interfere with each other are defined in advance as interference candidate surfaces and interference candidate sides, respectively, for each check target set. Then, the interference check unit determines the presence or absence of interference between each of the interference candidate surfaces and each of the interference candidate sides to determine the presence or absence of interference between the two machine elements constituting the check target set.

FIG. 8 is a diagram showing an example of attitude dependency information generated by an attitude dependency information update unit according to the present embodiment. FIG. 8 shows only attitude dependency information for an m-th check target set among the plurality of check target sets. The attitude dependency information storage unit stores the attitude dependency information as shown in FIG. 8 for all of the check target sets.

As shown in FIG. 8, the attitude dependency information according to the present embodiment includes information on a combination number of the plurality of interference candidate surfaces defined for one machine element constituting the check target set and the plurality of interference candidate sides defined for the other machine element, and information on the oblique coordinate systems defined for all the combinations of the plurality of interference candidate surfaces and the plurality of interference candidate sides (more specifically, information on the vector values of three basis vectors of these oblique coordinate systems). Here, when a total number of interference candidate surfaces in the m-th check target set is set as Nm and a total number of interference candidate sides is set as Mm, a total number of oblique coordinate systems in the m-th check target set is Nm×Mm.

Figure 9A:
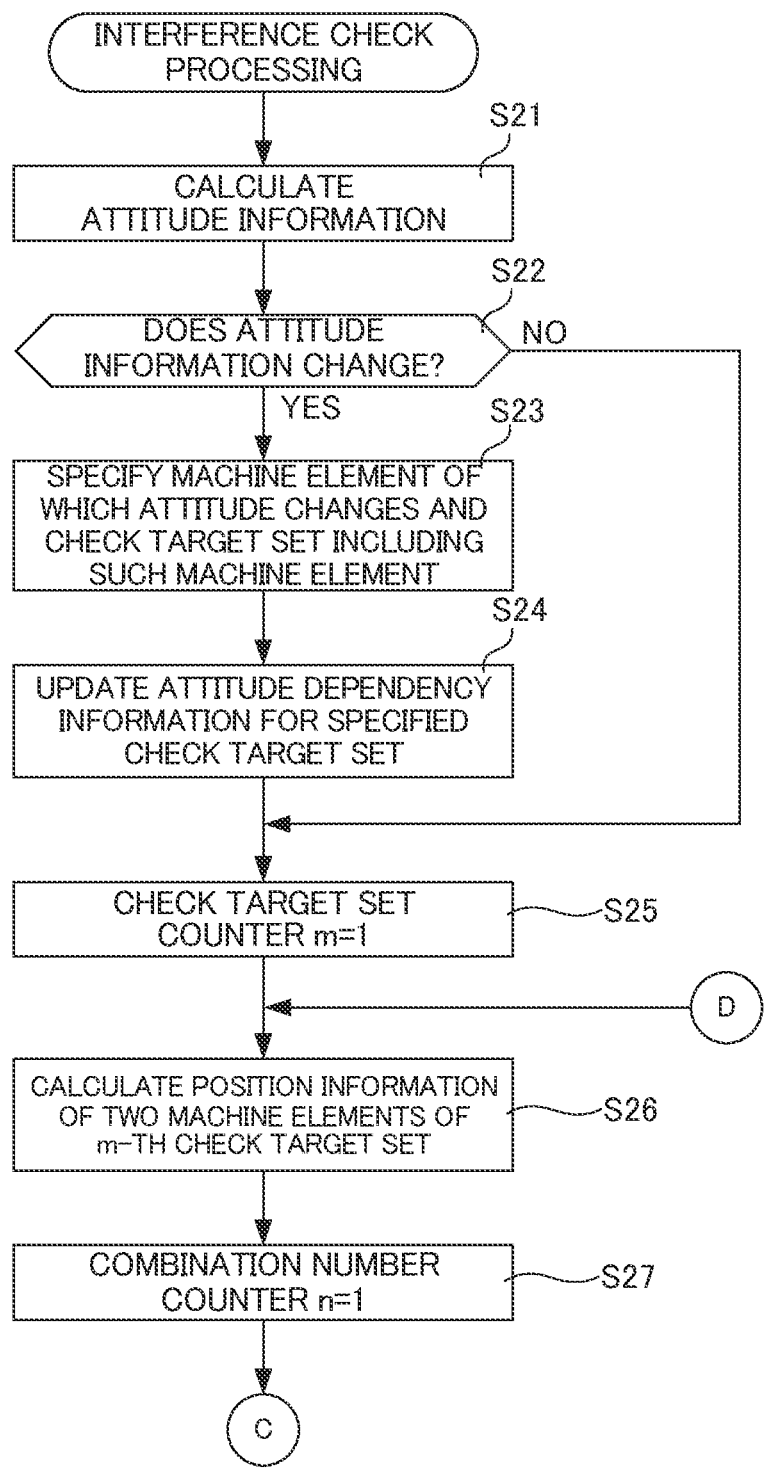
FIG. 9A is a flowchart showing a specific procedure of interference check processing in a numerical controller according to the second embodiment (Part 1)
Figure 9B:
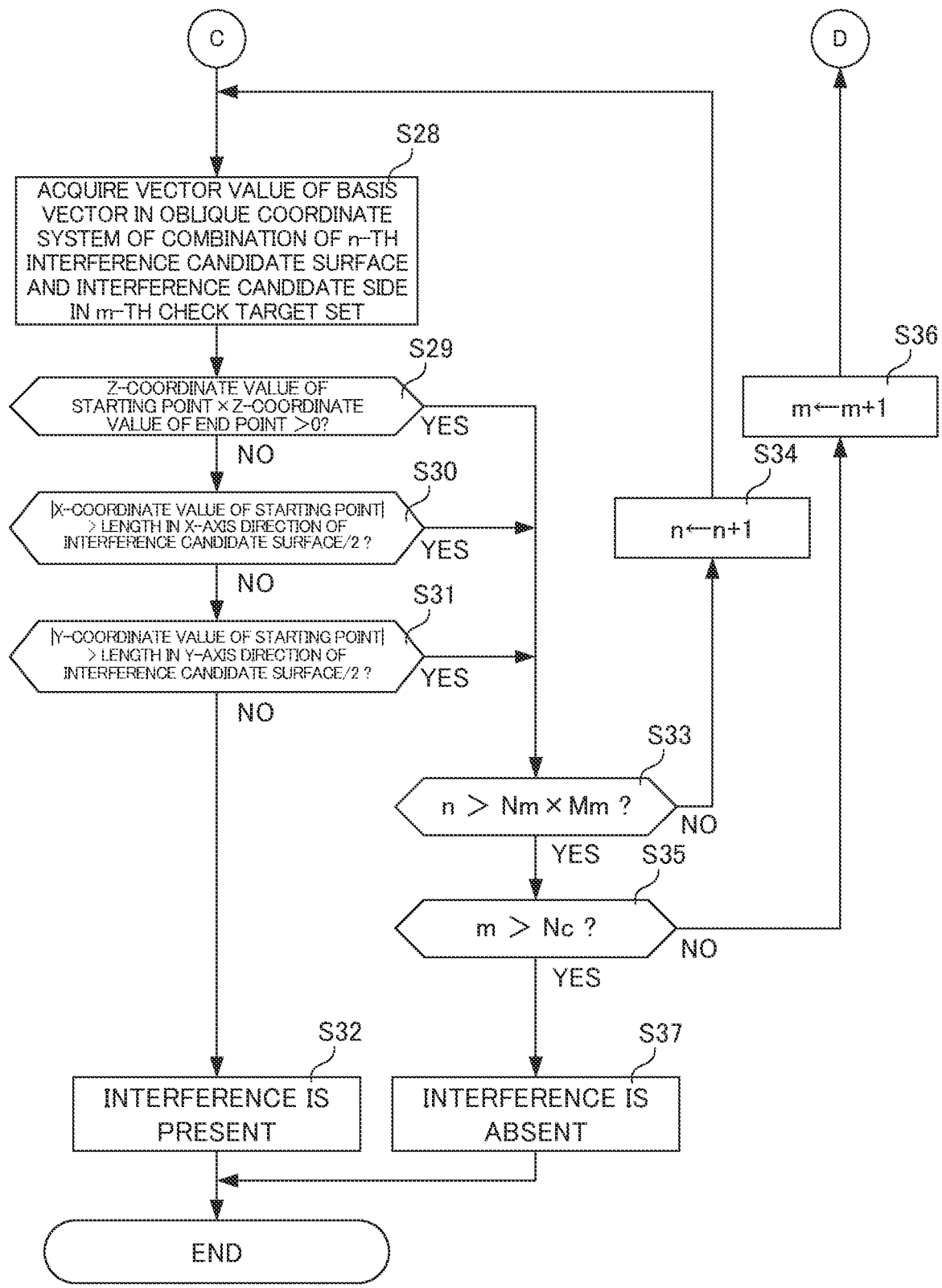
FIG. 9B is a flowchart showing a specific procedure of interference check processing in the numerical controller according to the second embodiment (Part 2)

FIGS. 9A and 9B are flowcharts showing specific procedures of interference check processing in the numerical controller according to the present embodiment. The interference check processing shown in FIGS. 9A and 9B is repeatedly executed by an interference check pre-processing device and an interference check unit every interpolation period as the machine control unit starts to control the machine tool. At the time of starting the interference check processing in FIGS. 9A and 9B, an attitude dependency information storage unit stores attitude dependency information generated in advance by an attitude dependency information update unit according to the initial attitude of each of the machine elements at the start of control by the machine control unit. In the following description, a total number of check target sets subjected to the interference check computation is set as Nc (Nc being an arbitrary integer equal to or greater than 1), and a total number of separation axis candidate vectors defined for the m-th check target set is set as Nm.

In S21, the attitude information monitoring unit calculates the attitude information of each of the machine elements based on the movement pulse transmitted from the pulse generation unit, and the process proceeds to S22. In S22, the attitude information monitoring unit compares the attitude information calculated during the previous interpolation period with the attitude information calculated during the current interpolation period to determine whether the attitude information of each of the machine elements changes. When the attitude information monitoring unit 51 determines to be YES in S22, the process proceeds to S23.

In S23, the attitude dependency information update unit specifies, based on the attitude information transmitted from the attitude information monitoring unit, the machine element of which attitude changes among the plurality of machine elements and the check target set including the machine element of which attitude changes, and the process proceeds to S24.

In S24, the attitude dependency information update unit acquires the attitude information transmitted from the attitude information monitoring unit and the shape information stored in the machine element shape storage unit, and updates, based on the attitude information and the shape information, the attitude dependency information stored in the attitude dependency information storage unit, and then the process proceeds to S25. More specifically, the attitude dependency information update unit recalculates, based on the acquired attitude information and shape information, the attitude dependency information (vector values of three basis vectors of the oblique coordinate system for all the combinations of the plurality of interference candidate surfaces and the plurality of interference candidate sides) for the check target set specified in S23, and updates the attitude dependency information stored in the attitude dependency information storage unit according to the result of the recalculation.

When the determination result in S22 is NO, that is, when the attitude information does not change, the attitude dependency information update unit does not execute the processes of S23 and S24, that is, does not update the attitude dependency information stored in the attitude dependency information storage unit, and then the process proceeds to S25.

In S25, the interference check unit sets a value of a check target set counter m to 1, and then the process proceeds to S26. In S26, the interference check unit calculates, based on the movement pulse transmitted from the pulse generation unit, position information of the two machine elements constituting the m-th check target set, and then the process proceeds to S27. In S27, the interference check unit sets a value of a combination number counter n to 1, and then the process proceeds to S28.

In S28, the interference check unit acquires a vector value of three basis vectors of an oblique coordinate system of a combination of n-th interference candidate surface and interference candidate side in the m-th check target set from the attitude dependency information storage unit, and then the process proceeds to S29.

Figure 10:
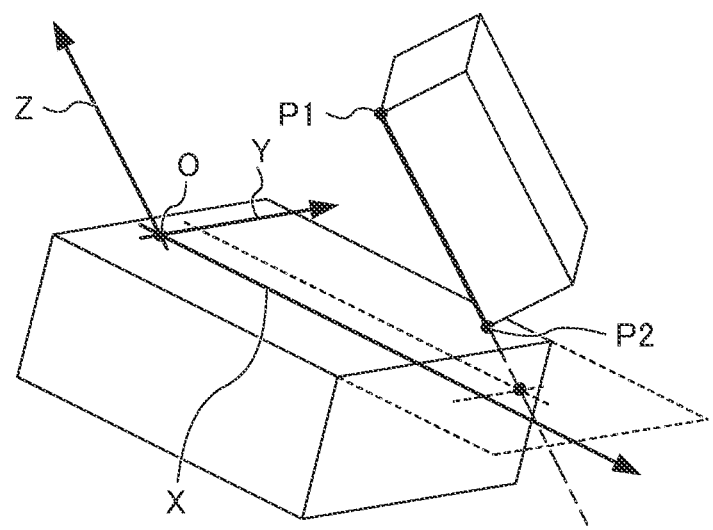
FIG. 10 is a diagram for explaining an algorithm for an interference check computation in the interference check unit according to the second embodiment.

In S29, the interference check unit calculates a coordinate value along the Z-axis of a starting point P1 (see FIG. 10) and a coordinate value along the Z-axis of an end point P2 (see FIG. 10) of the interference candidate side in the oblique coordinate system acquired in S28, based on the vector values of the three basis vectors acquired in S28, the shape information stored in the machine element shape storage unit, and the position information of the two machine elements constituting the m-th check target set acquired in S26, and determines whether the product of the Z-coordinate value of the starting point and the Z-coordinate value of the end point is positive. When the interference check unit determines to be NO in S29, the process proceeds to S30.

In S30, the interference check unit calculates a coordinate value along the X-axis of the starting point P1 (see FIG. 10) of the interference candidate side in the oblique coordinate system acquired in S28 and a length along the X-axis of the interference candidate surface, based on the vector values of the three basis vectors acquired in S28, the shape information stored in the machine element shape storage unit, and the position information of the two machine elements constituting the m-th check target set acquired in S26, and determines whether an absolute value of the X-coordinate value of the starting point is greater than a value obtained by multiplying the length along the X-axis of the interference candidate surface by ½. When the interference check unit determines to be NO in S30, the process proceeds to S31.

In S31, the interference check unit calculates a coordinate value along the Y-axis of the starting point P1 (see FIG. 10) of the interference candidate side in the oblique coordinate system acquired in S28 and a length along the Y-axis of the interference candidate surface, based on the vector values of the three basis vectors acquired in S28, the shape information stored in the machine element shape storage unit, and the position information of the two machine elements constituting the m-th check target set acquired in S26, and determines whether an absolute value of the Y-coordinate value of the starting point is greater than a value obtained by multiplying the length along the Y-axis of the interference candidate surface by ½. When the interference check unit determines to be NO in S31, the process proceeds to S32.

In S32, the interference check unit determines that interference occurs between the two machine elements constituting the m-th check target set at the n-th interference candidate surface and interference candidate side, and then the interference check processing ends. Further, when it is determined that interference occurs in any of 1 to Nc-th check target sets, the interference check unit notifies the pulse generation unit of the fact, and stops the generation of the movement pulse and the input to the machine tool before the interference actually occurs.

In addition, when it is determined to be YES in any of S29 to S31 described above, the process proceeds to S33, the interference check unit determines whether the value of the combination number counter n is greater than the total number Nm×Mm of oblique coordinate systems defined for the m-th check target set. When it is determined to be NO in S33, the interference check unit counts up the value of the combination number counter n by one (see S34) in order to try the next oblique coordinate system, and then the process returns to S28.

Further, when it is determined to be YES in S33, the process proceeds to S35, the interference check unit determines whether the value of the check target set counter m is greater than the total number Nc of check target sets. When it is determined to be NO in S35, the interference check unit counts up the value of the check target set counter by one (see S36) in order to determine the presence or absence of interference in the next check target set, and then the process returns to S26. When it is determined to be YES in S35, the interference check unit determines that interference does not occurs in all of the 1 to Nc-th check target sets (see S37), and then the interference check processing ends.

According to the present embodiment, the following effects are achieved. The interference check unit according to the present embodiment determines the presence or absence of interference based on the coordinate values of the other machine element in the oblique coordinate system in which two axes orthogonal to each other in the plane parallel to the surface of one machine element of the two machine elements constituting the check target set are defined as the X-axis and the Y-axis, respectively, and the axis parallel to the side of the other machine element is defined as the Z-axis, and the attitude dependency information storage unit stores the attitude dependency information including the information on the oblique coordinate system defined for each of the check target sets. According to the present embodiment, it is possible to efficiently determine the presence or absence of interference with a small number of computations.

Here, the algorithm for the interference check computation according to the second embodiment based on the surfaces and sides will be compared with the algorithm for the interference check computation according to the first embodiment based on the separation axes. In the algorithm according to the second embodiment, it can be determined that there is interference as long as any one of the combinations of the plurality of surfaces and sides satisfies the conditions based on S29 to S31, whereas in the algorithm according to the first embodiment, it cannot be determined that there is interference unless all of the plurality of separation axis candidate vectors satisfy the condition based on S10. In other words, the algorithm according to the second embodiment takes faster time to determine that there is interference than the algorithm according to the first embodiment. Therefore, conversely, the algorithm according to the first embodiment takes faster time to determine that there is no interference than the algorithm according to the second embodiment.

Therefore, under a situation where the possibility of interference is high for some reason, it is preferable to perform the interference check computation based on the algorithm according to the second embodiment. Here, the situation where the possibility of interference is high includes, for example, a case where it is determined that there is no interference due to a slight difference in the previous interference check computation, a case where it is determined that there is interference under the shape information approximated so as to include the machine element, and a case where a distance between the two machine elements is short. Conversely, under a situation where the possibility of interference is low for some reason, it is preferable to perform the interference check computation based on the algorithm according to the first embodiment.

The present disclosure is not limited to the above-described embodiments, and various modifications and changes can be made. For example, the five-axis machine tool 2 as shown in FIG. 2 has been described as an example in the embodiments, but the present disclosure is not limited thereto. The present disclosure can be applied to machine tools with any number of axes. For example, in a three-axis machine tool, since the attitude of machine elements rarely changes, effects largely increase as the attitude dependency information storage unit stores the attitude dependency information.

EXPLANATION OF REFERENCE NUMERALS

1 . . . numerical control system
2 . . . machine tool
3 . . . numerical controller
31 . . . machining program memory
32 . . . command analysis unit
33 . . . interpolation unit
34 . . . pulse generation unit
36 . . . interference check unit
37 . . . machine element shape storage unit
5 . . . interference check pre-processing device
51 . . . attitude information monitoring unit
52 . . . attitude dependency information update unit
53 . . . attitude dependency information storage unit

The invention claimed is:

1. A numerical control system that causes a plurality of machine elements of a machine tool to move along a plurality of axes based on a movement command and performs an interference check computation between two machine elements constituting a predetermined check target set, the numerical control system comprising:
    an attitude dependency information storage unit that stores attitude dependency information which is information dependent on a shape and an attitude of each of the two machine elements constituting the check target set;
    an interference check unit that acquires position information of each of the machine elements and performs the interference check computation based on the position information and the attitude dependency information stored in the attitude dependency information storage unit; and
    an attitude dependency information update unit that acquires shape information and attitude information of each of the machine elements and updates the attitude dependency information based on the shape information and the attitude information,
    the attitude dependency information update unit being configured to not update the attitude dependency information when the attitude information does not change.

2. The numerical control system according to claim 1, wherein the attitude dependency information is information that is not dependent on a position of each of the two machine elements constituting the check target set.

3. The numerical control system according to claim 1, further comprising an attitude information monitoring unit that monitors the attitude information of each of the machine elements based on the movement command, wherein
    the attitude dependency information update unit updates the attitude dependency information when the attitude information monitoring unit determines that the attitude information changes.

4. The numerical control system according to claim 1, wherein the attitude dependency information storage unit stores the attitude dependency information for each of the check target sets, and
    the attitude dependency information update unit updates, when the attitude information changes, the attitude dependency information for the check target set including the machine element of which attitude changes and does not update the attitude dependency information for the check target set not including the machine element of which attitude changes.

5. The numerical control system according to claim 1, wherein the interference check unit determines, in the interference check computation, the presence or absence of interference by determining the presence or absence of a separation plane for separating the two machine elements constituting the check target set and a separation axis orthogonal to the separation plane based on the position information and the attitude dependency information, and
    the attitude dependency information includes a plurality of separation axis candidate vectors defined for each of the check target sets and radii in a separation axis direction which are radii when the two machine elements constituting the check target set are projected onto the separation axis candidate vectors.

6. The numerical control system according to claim 1, wherein the interference check unit determines, in the interference check computation, the presence or absence of interference based on coordinate values of another machine element in an oblique coordinate system in which two axes orthogonal to each other in a plane parallel to a surface of one machine element of the two machine elements constituting the check target set are defined as an X-axis and a Y-axis, respectively, and an axis parallel to a side of the other machine element is defined as a Z-axis, and
    the attitude dependency information includes information on the oblique coordinate system defined for each of the check target sets.

* * * * *